(12) United States Patent
Nguyen (10) Patent No.: US 8,505,566 B2
(45) Date of Patent: Aug. 13, 2013

(54) VALVE GLUE DIVERTER (75) Inventor: Quynh Nguyen, Montclair, CA (US)

(73) Assignee: The Toro Company, Bloomington, MN (US)

( * ) Notice: Subject to any disclaimer, the term of this patent is extended or adjusted under 35 U.S.C. 154(b) by 835 days.

(21) Appl. No.: 11/940,218

(22) Filed: Nov. 14, 2007

(65) Prior Publication Data

US 2009/0101855 A1 Apr. 23, 2009

Related U.S. Application Data

(60) Provisional application No. 60/980,677, filed on Oct. 17, 2007.

(51) Int. Cl.
*F16K 51/00* (2006.01)
(52) U.S. Cl.
USPC .............. 137/15.09; 251/151; 251/30.02
(58) Field of Classification Search
USPC ............... 251/331, 30.02, 30.01, 148, 151; 137/15.09
See application file for complete search history.

(56) References Cited

U.S. PATENT DOCUMENTS

| | | |
|---|---|---|
| 954,313 A | 4/1910 | Lillyman |
| 3,239,148 A | 3/1966 | Entyre |
| 3,336,843 A | 8/1967 | Griswold |
| 3,346,004 A * | 10/1967 | Costello ................ 251/30.02 |
| 3,357,567 A | 12/1967 | Wake |
| 3,517,714 A | 6/1970 | Desbarats |
| 3,550,775 A | 12/1970 | Cooley |
| 3,578,284 A * | 5/1971 | Martini .................. 251/30.02 |
| 3,599,866 A | 8/1971 | Bolton |
| 3,623,607 A | 11/1971 | Loos |
| 3,653,348 A | 4/1972 | Baumhaft |
| 3,662,953 A | 5/1972 | Wiens |
| 3,754,651 A | 8/1973 | Lannoch |
| 3,782,634 A | 1/1974 | Herman |
| 3,850,802 A | 11/1974 | Berger |
| 3,959,140 A | 5/1976 | Legras |
| 4,003,837 A | 1/1977 | Osborne |
| 4,019,984 A | 4/1977 | Mohn |
| 4,039,452 A | 8/1977 | Fernandez |
| 4,045,345 A | 8/1977 | Drori |
| 4,060,483 A | 11/1977 | Barzuza |
| 4,081,171 A | 3/1978 | Morgan et al. |
| 4,135,696 A | 1/1979 | Saarem et al. |
| 4,180,236 A | 12/1979 | Saarem et al. |

(Continued)

FOREIGN PATENT DOCUMENTS

EP 1 245 258 A2 10/2002
JP 2000-256493 A 9/2000

OTHER PUBLICATIONS

United States Patent and Trademark Office, Notice of Allowance mailed Oct. 3, 2005 in U.S. Appl. No. 10/789,862, 6 pages.

(Continued)

*Primary Examiner* — John K Fristoe, Jr.
*Assistant Examiner* — Andrew J Rost
(74) *Attorney, Agent, or Firm* — Inskeep IP Group, Inc.

(57) ABSTRACT

In one preferred embodiment, the present invention includes a valve having a glue diverter to divert or prevent glue from blocking a solenoid discharge passage and thereby ensure operation of the valve. The discharge passage terminates in a protruding area, spaced away from a surrounding area so as to allow excess glue within the valve to travel around the discharge passage.

7 Claims, 12 Drawing Sheets

(56) References Cited

U.S. PATENT DOCUMENTS

| | | | |
|---|---|---|---|
| 4,217,116 | A | 8/1980 | Seever |
| 4,235,414 | A | 11/1980 | Lis |
| 4,271,018 | A | 6/1981 | Drori |
| 4,278,540 | A | 7/1981 | Drori |
| 4,337,158 | A | 6/1982 | Bodine |
| 4,360,037 | A | 11/1982 | Kendall |
| 4,505,450 | A * | 3/1985 | Saarem et al. ............ 251/30.01 |
| 4,530,463 | A | 7/1985 | Hiniker et al. |
| 4,655,910 | A | 4/1987 | Tabor |
| 4,655,911 | A | 4/1987 | Tabor |
| 4,671,485 | A * | 6/1987 | Saarem ................. 251/30.03 |
| 4,736,889 | A | 4/1988 | Stephenson |
| 4,818,402 | A | 4/1989 | Steiner et al. |
| 4,911,401 | A * | 3/1990 | Holcomb et al. ......... 251/30.03 |
| 4,919,801 | A | 4/1990 | Hobson, Jr. |
| 4,981,261 | A * | 1/1991 | Bergmann et al. ............ 251/45 |
| 5,028,017 | A | 7/1991 | Simmons et al. |
| 5,074,999 | A | 12/1991 | Drori |
| 5,134,961 | A | 8/1992 | Giles et al. |
| 5,144,699 | A * | 9/1992 | Graham ..................... 4/256.1 |
| 5,192,429 | A | 3/1993 | Bader |
| 5,213,303 | A | 5/1993 | Walker |
| 5,228,993 | A | 7/1993 | Dori |
| 5,312,544 | A | 5/1994 | Kinney |
| 5,389,243 | A | 2/1995 | Kaplan |
| 5,401,396 | A | 3/1995 | Lescovich et al. |
| 5,431,181 | A * | 7/1995 | Saadi et al. ................ 137/15.11 |
| 5,433,380 | A | 7/1995 | Hahn |
| 5,560,820 | A | 10/1996 | Consolo |
| 5,584,314 | A | 12/1996 | Bron |
| 5,670,038 | A | 9/1997 | McKinney |
| 5,704,546 | A | 1/1998 | Henderson et al. |
| 5,804,072 | A | 9/1998 | Yang |
| 5,830,347 | A | 11/1998 | Vollmer |
| 5,911,362 | A | 6/1999 | Wood et al. |
| 5,979,304 | A | 11/1999 | Norais |
| 5,996,608 | A | 12/1999 | Hunter et al. |
| 6,110,388 | A | 8/2000 | Norais et al. |
| 6,186,413 | B1 | 2/2001 | Lawson |
| 6,394,413 | B2 | 5/2002 | Lohde et al. |
| 6,575,307 | B2 | 6/2003 | Lockwood |
| 7,007,916 | B2 | 3/2006 | Lee |
| 7,501,058 | B1 | 3/2009 | Lawrence, Sr. |

OTHER PUBLICATIONS

United States Patent and Trademark Office, Office Action mailed Jun. 21, 2005 in U.S. Appl. No. 10/789,862, 6 pages.
United States Patent and Trademark Office, Notice of Allowance mailed Aug. 12, 2004 in U.S. Appl. No. 10/264,671, 7 pages.
United States Patent and Trademark Office, Office Action mailed Dec. 4, 2003 in U.S. Appl. No. 10/264,671, 16 pages.
United States Patent and Trademark Office, Notice of Allowance mailed Sep. 26, 2012 in U.S. Appl. No. 12/326,627, 7 pages.
United States Patent and Trademark Office, Final Office Action mailed Feb. 22, 2012 in U.S. Appl. No. 12/326,627, 9 pages.

* cited by examiner

FIGURE 1

PRIOR ART

VALVE GLUE DIVERTER

RELATED APPLICATIONS

This application claims priority to U.S. Provisional Application Ser. No. 60/980,677 filed Oct. 17, 2007 entitled Slip Valve Glue Diverter, which is hereby incorporated by reference.

BACKGROUND OF THE INVENTION

Flow control valves are a well-known and integral part of most irrigation systems. A typical example can be seen in U.S. Pat. No. 6,394,413 to Lohde et al., hereby incorporated by reference.

These valves control the flow of water through an upstream pipe and thereby turn sprinklers fed by the pipe on and off. Such valves are usually remotely actuated by control signals sent from an automated irrigation controller. Often these control signals are electric current sent from the controller to a solenoid in the valve which ultimately controls whether the valve is open or closed.

Solenoid-activated diaphragm-operated valves for use in irritation systems are well known. One example can be seen in U.S. Pat. No. 6,394,413 to Lohde et al., previously incorporated by reference.

This style of valve has a closure member with a sealing surface which moves against or away from an annular seat to close or open the valve. Integral to the closure member is a diaphragm positioned to seal off an upper portion of the valve. When the valve is to be opened, the fluid pressure is relieved by bleeding fluid out of the diaphragm chamber through a manual valve or a remotely operated solenoid valve. Relieving this pressure allows the closure member to move upwards as water passes through the valve. The discharged water is most conveniently released into the passageway, beyond the primary flow-controlling sealing member, near the outlet port. This design is commonly referred to as "internal bleed" offering the advantage that no water is discharged outside the fluid path.

A typical style of valve, of interest in this invention, is constructed of PVC (polyvinyl chloride plastic). One type has inlet and outlet that will accept standard threaded fittings. These require an additional fitting to create the threaded joint with PVC pipe. Another valve fitting design called a slip fit will accept PVC pipe directly, being fastened with suitable solvent-based glue.

Solenoid valve installation into an irrigation system typically involves applying a primer to the end of a pipe (such as a PVC pipe), then coating the outer end surface of the pipe and possibly the inner surface of the valve fitting, with glue (e.g., PVC glue). Finally, the end of the pipe is inserted into the water inlet port. The same process is repeated for the water outlet port of the valve.

Ideally, an appropriate amount of glue is applied to the pipe and therefore remains only between the pipe and the fitting for the pipe. However, it can be difficult to determine the appropriate amount of glue for installation. Therefore, contractors will frequently apply excess glue to both coated surfaces.

This excess glue is often pushed or expelled on to the inner surfaces of the valve. When a pipe is inserted into the water outlet port, the glue can inadvertently cover the discharge passage of the discharge port. The discharge port allows the solenoid to relieve pressure in the diaphragm chamber and therefore open the valve to water flow. Thus, the solenoid is unable to release water from the diaphragm chamber when the discharge passage is blocked by glue, thereby preventing the valve from opening.

OBJECTS AND SUMMARY OF THE INVENTION

It is an object of the invention to provide an improved valve that resists blocking the discharge passage.

In one preferred embodiment, the present invention includes a valve having a glue diverter to divert or prevent glue from blocking a solenoid discharge passage and thereby ensure operation of the valve. The discharge passage terminates in a protruding area, spaced away from a surrounding area so as to allow excess glue within the valve to travel around the discharge passage.

DETAILED DESCRIPTION OF THE INVENTION

Figure 1:
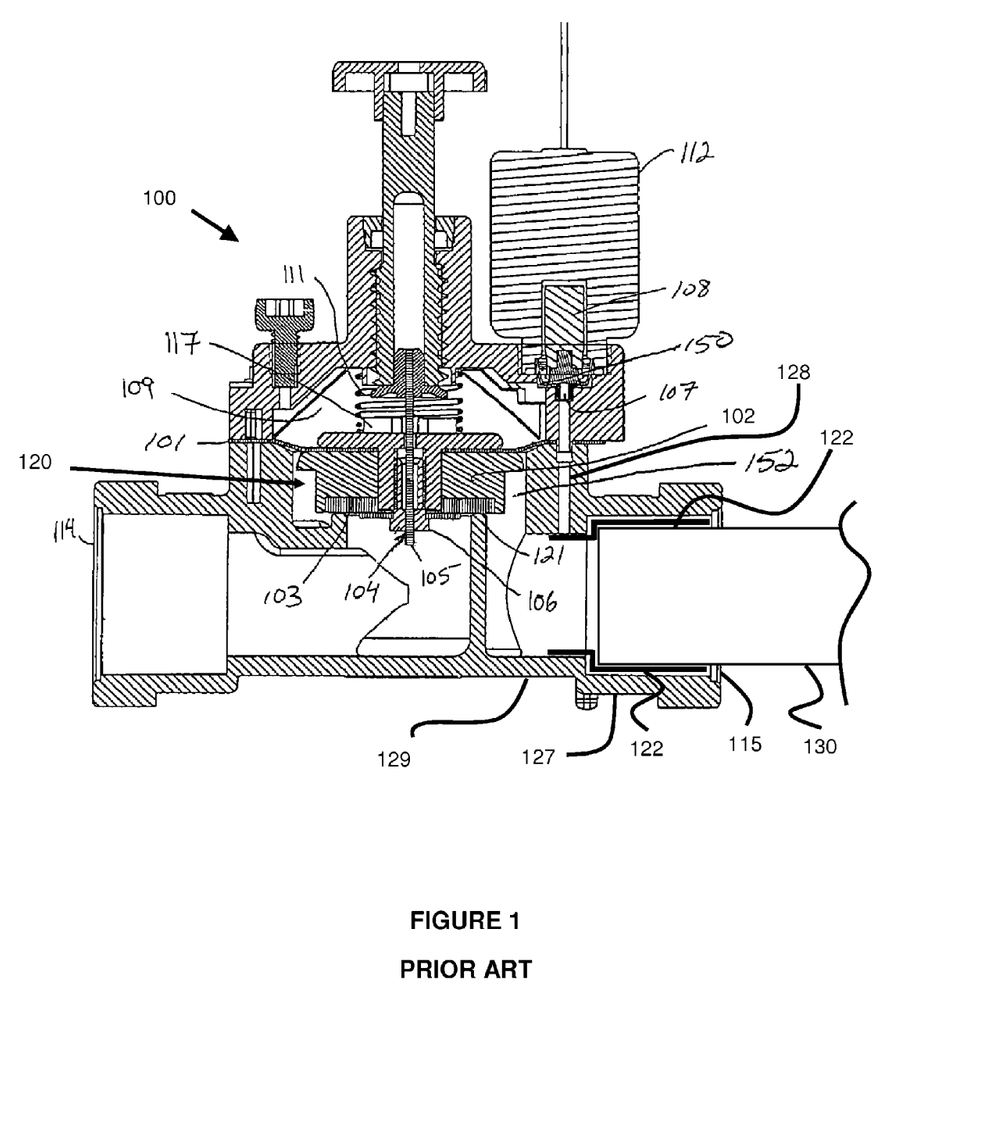
FIG. 1 illustrates a side cross sectional view of a prior art valve.
Figure 2:
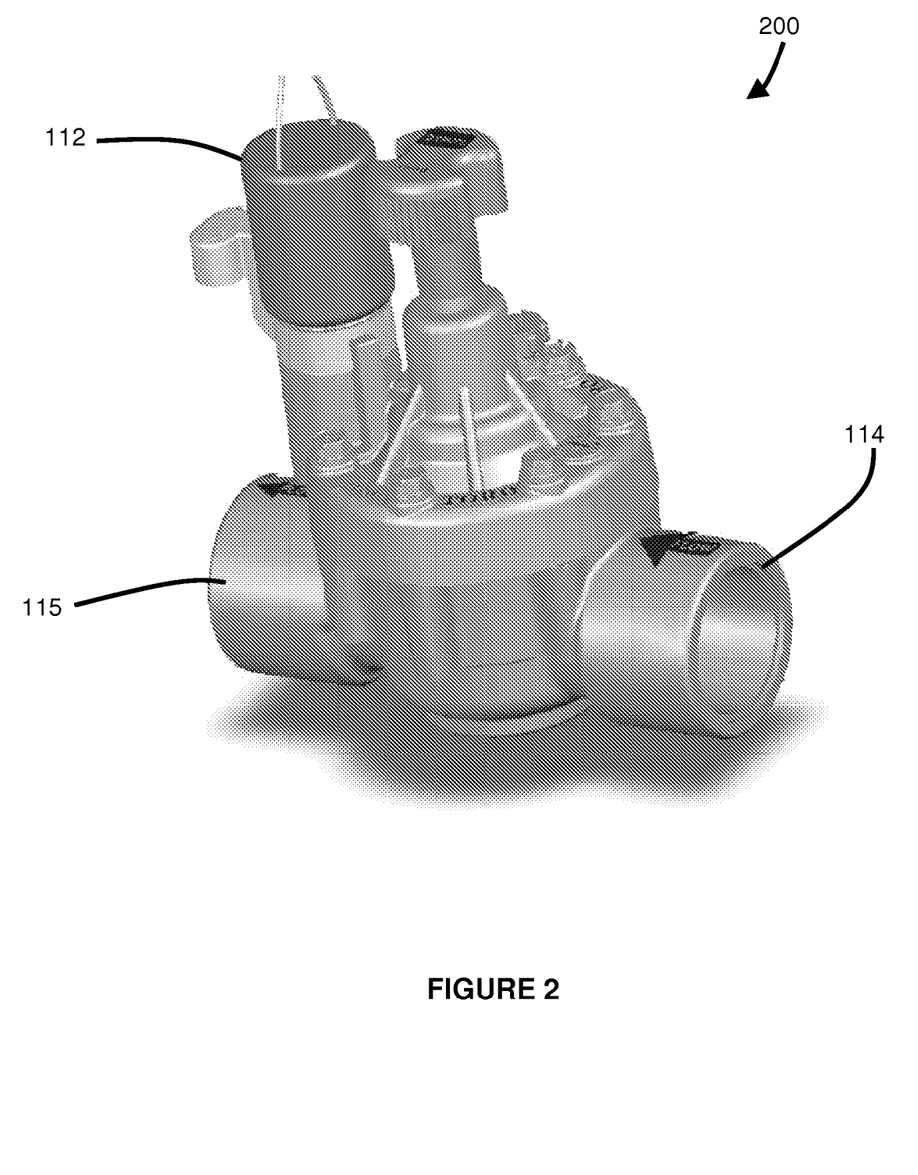
FIG. 2 illustrates a perspective view of a valve according to a preferred embodiment of the present invention.
Figure 3:
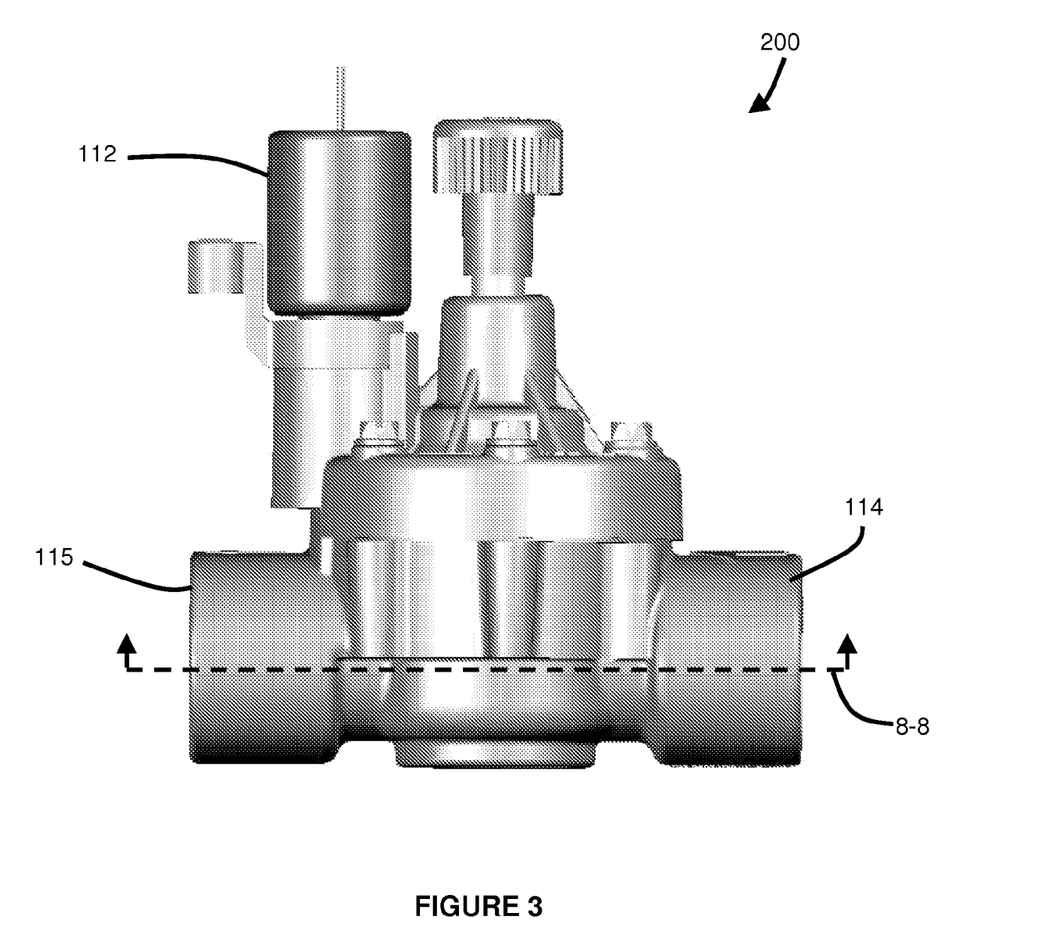
FIG. 3 illustrates a side view of the valve of FIG. 2.
Figure 4:
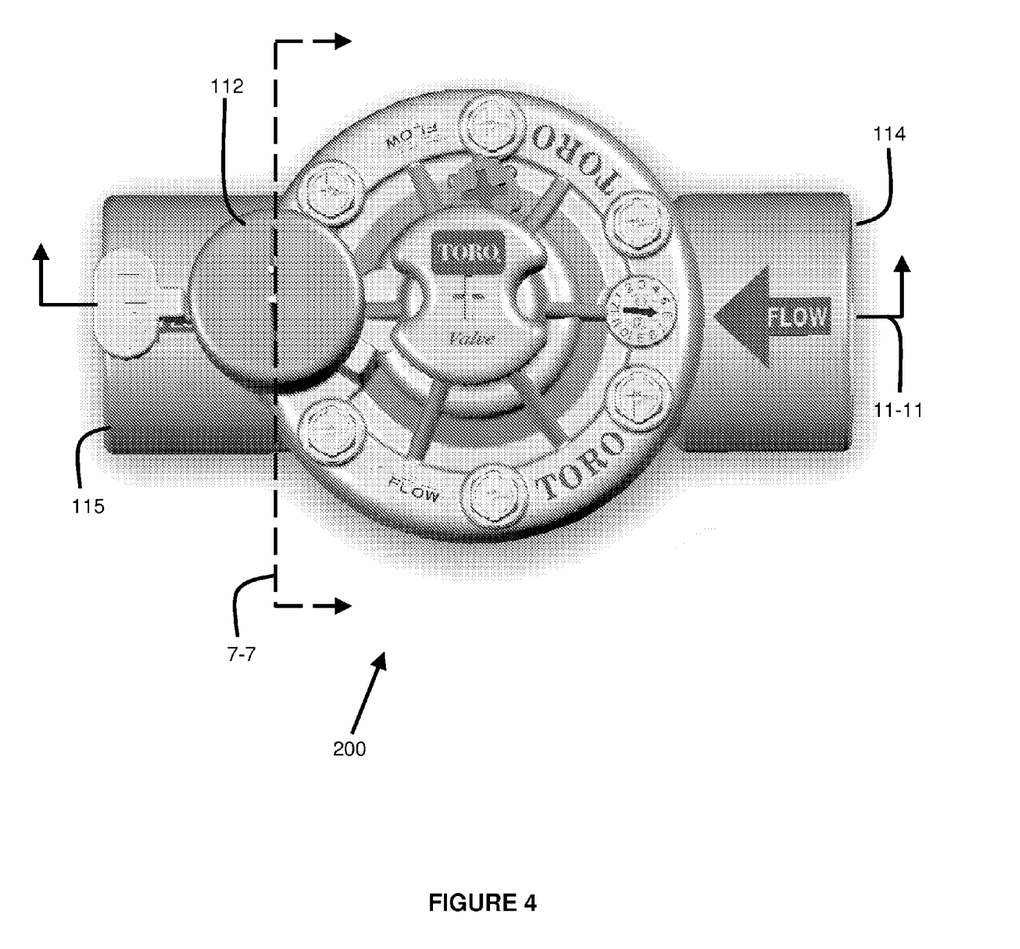
FIG. 4 illustrates a top view of the valve of FIG. 2.
Figure 5:
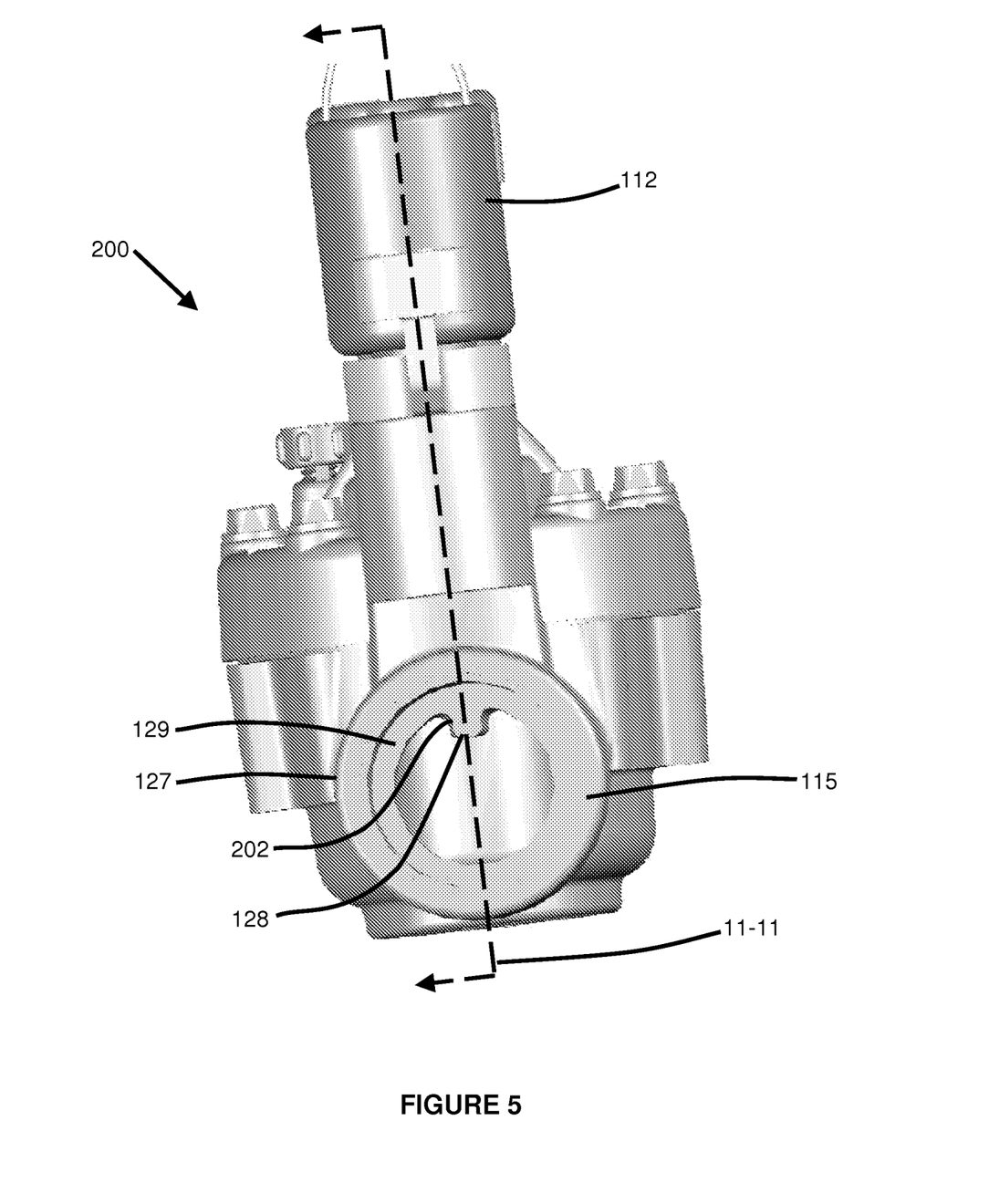
FIG. 5 illustrates an end view of the valve of FIG. 2.
Figure 6:
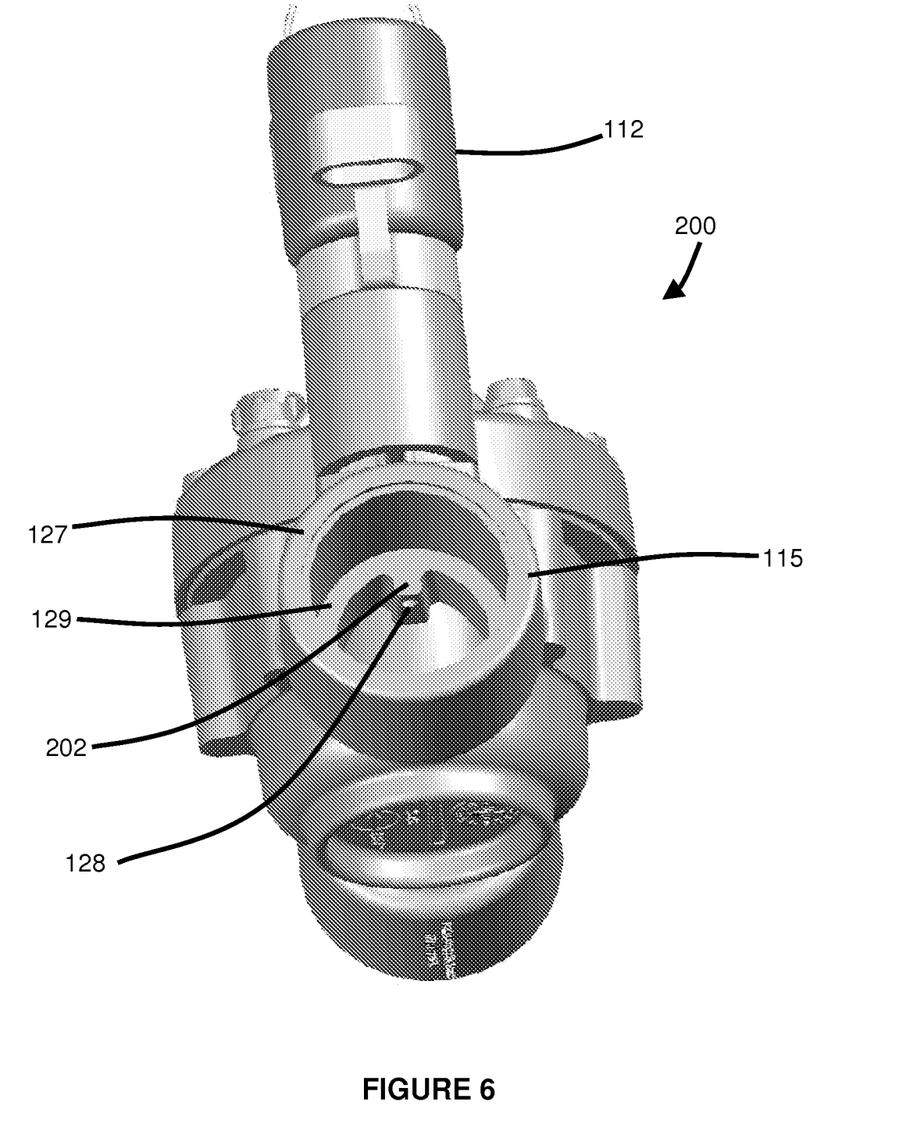
FIG. 6 illustrates a perspective end view of the valve of FIG. 2.
Figure 7:
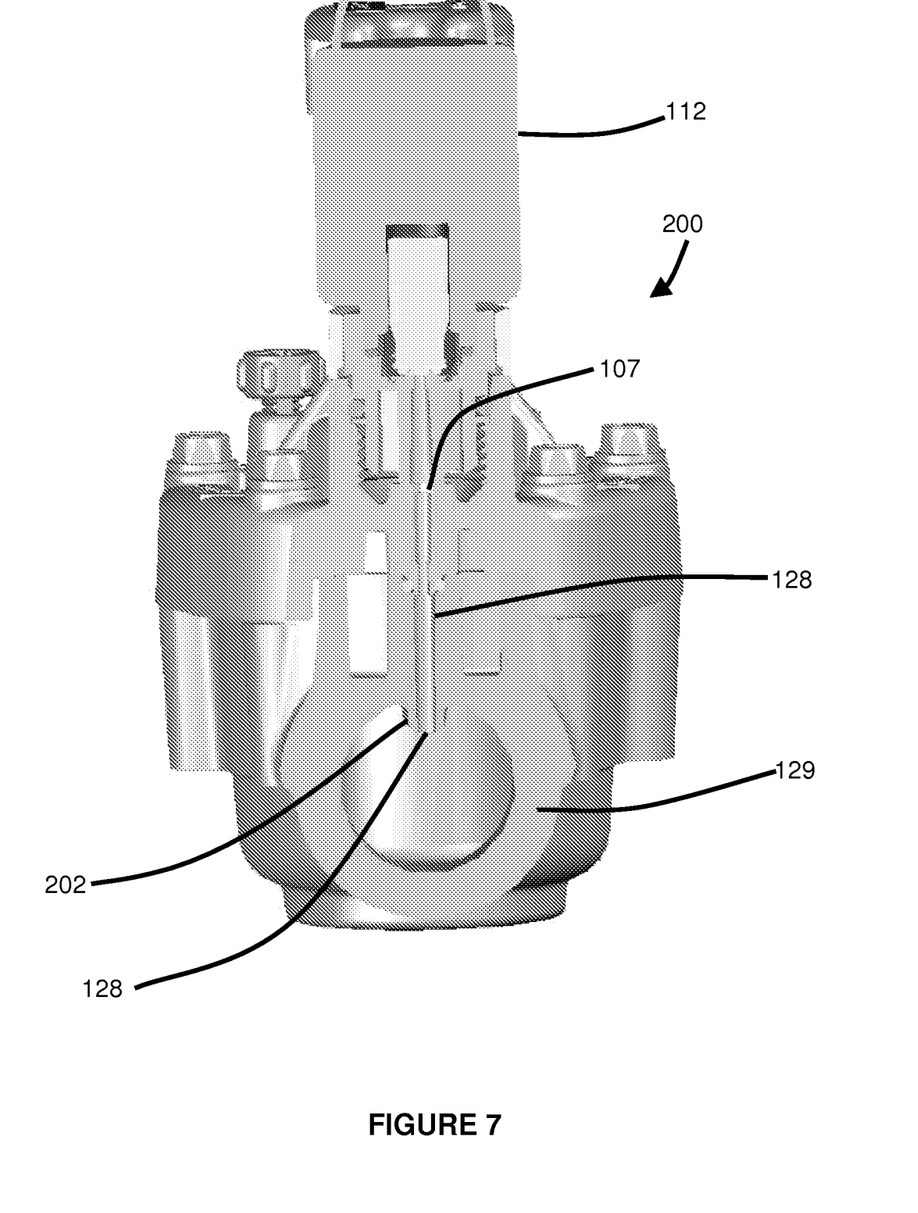
FIG. 7 illustrates a cross section view taken along line 7-7.
Figure 8:
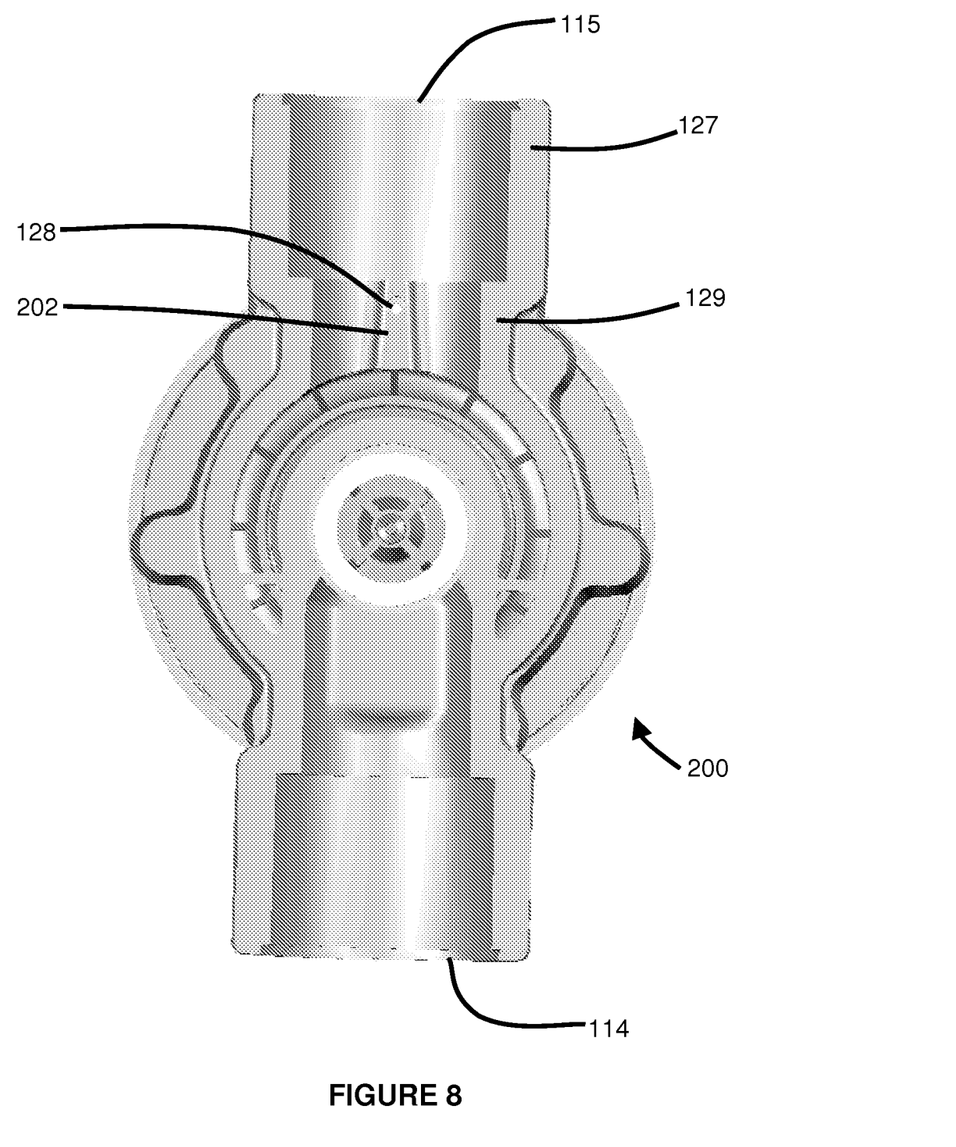
FIG. 8 illustrates a cross sectional view taken along line 8-8.
Figure 9:
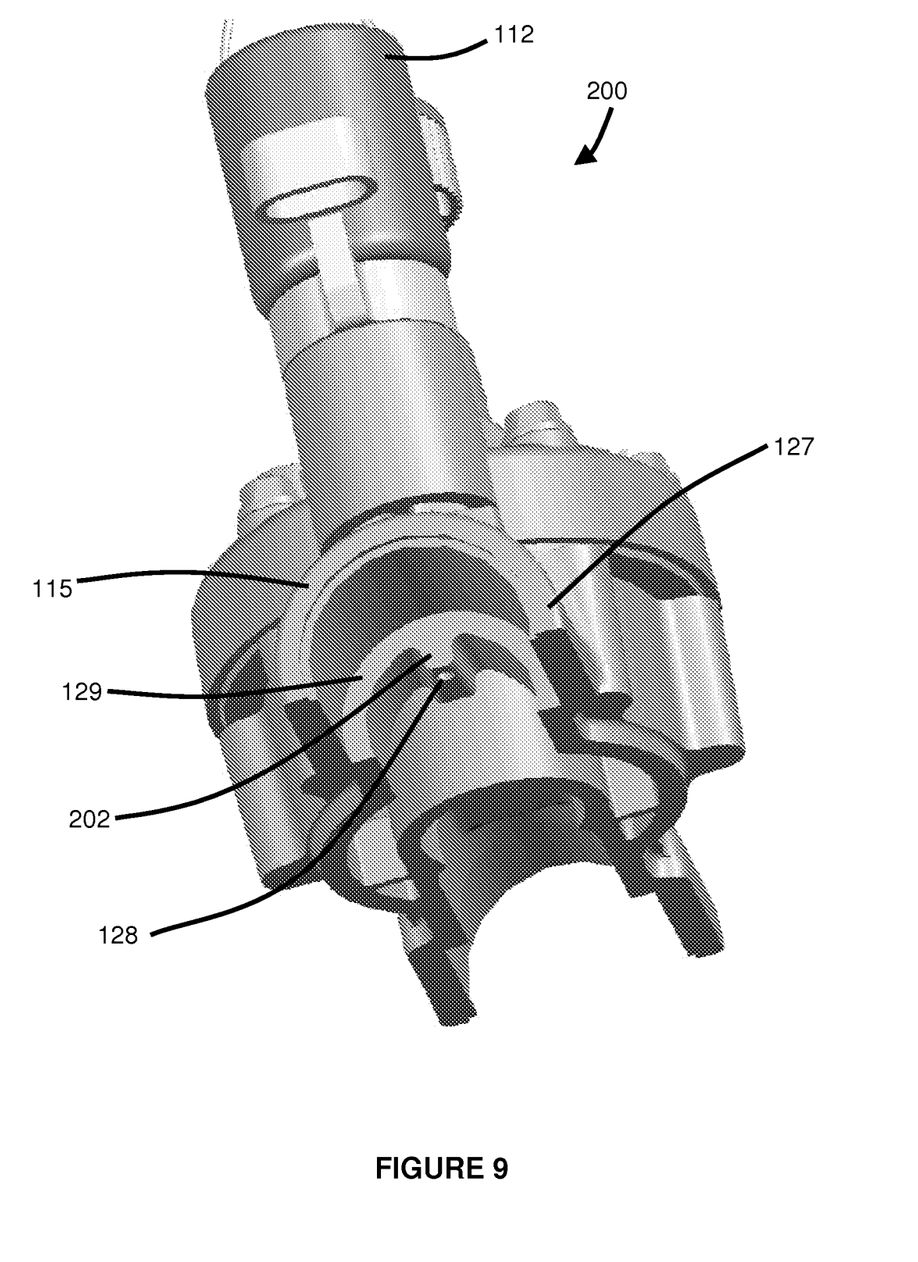
FIG. 9 illustrates a cross sectional perspective view taken along line 8-8.

FIG. 1 illustrates a prior art irrigation valve 100 in the closed position. This irrigation valve 100 includes a water inlet port 114, a water outlet port 115, and a guide washer 102 that includes a sealing surface 103. Typically the sealing surface 103 is made from a rubber or other resilient material.

The valve is actuated by a solenoid 112 that is connected to a solenoid plunger 108 which controls the opening and closing of a discharge port 107. In the closed position, the solenoid plunger 108 blocks a passage 150 that otherwise connects a diaphragm chamber 109 (located above a diaphragm 101) to the discharge port 107 and to the valve water outlet port 115.

The valve assembly seals off the diaphragm chamber 109 from the lower portion of the valve. The valve assembly 120 is made up of a diaphragm retaining cap 117 which sits over a diaphragm 101. Beneath the diaphragm sits a guide washer 102 having an inner circular channel 110. Retained in the guide washer 102 is a sealing surface 103. The sealing surface 103 is secured to the guide washer 102 with a valve washer 118 and metering insert 106.

The diaphragm 101 is typically composed of a semi elastic material such as rubber. Such elastic material allows the diaphragm to flex as the valve assembly 120 rises up to an open position and down to a closed position.

The metering pin 105 is located within the center of valve assembly 120. The clearance 104 between the metering insert 106 and metering pin 105 allows water to enter into the diaphragm chamber 109. The diameter of the metering pin 105 may be changed to let varying amounts of water into the diaphragm chamber 109, thus controlling the pressure within the diaphragm chamber 109 as well as the rate of opening and closing.

In the closed position, the water pressure in the diaphragm chamber 109 is equal to the water pressure in the valve through water inlet port 114. In contrast, the water pressure of diaphragm chamber 109 is much less than the pressure of water entering through the water inlet port 114 when the valve is set to the open position as discussed below. The pressure is lower due to the pressure drop that occurs when the water flows through the clearance 104.

In operation, a water supply is connected to water inlet port 114, and further portions of an irrigation system are connected to water outlet port 115. When the solenoid 112 is un-energized, the solenoid plunger 108 is biased to cover and seal the discharge port 107. As water enters from the water inlet port 114, it travels through the clearance 104 of the metering insert 106, into the diaphragm chamber 109. Simultaneously, due to losses resulting from flow of water, the pressure of the inlet port 114 drops while passing between the seal surface 103 and valve seat 121, causing an annular area of low pressure 152, which helps the diaphragm assembly 120 to move downwards. Pressure builds within the diaphragm chamber 109 until it approaches equalization with the water pressure coming in from water inlet port 114. Typical inlet pressure is about 60 psi. With the help of the spring 111, the diaphragm assembly continues downwards until the sealing surface 103 makes contact with the valve seat 121.

In the shut position, the pressure within the diaphragm chamber 109 is equal to the pressure of the inlet 114, but the overall force on the diaphragm assembly 120 is downwards. This is due to the fact that the pressure in the diaphragm chamber 109 is exerting its effect over a larger surface area of the diaphragm assembly 120, than the pressure in the inlet 114. This downward resultant force prevents the diaphragm assembly 120 from being pushed up from the water pressure of the inlet 114. As a result, the sealing surface 103 of the diaphragm assembly 120 remains seated on the valve seat 121, preventing passage of the inlet water through the valve.

When the solenoid 112 is energized, the solenoid plunger 108 lifts and thus allows water from the diaphragm chamber 109 to pass through the discharge port 107 and out to the water outlet port 115. The open discharge port 107 thus causes pressure in the diaphragm chamber 109 to drop. As a result, the water from the water inlet port 114 pushes up on the valve assembly 120, which compresses valve spring 111 and unseats the sealing surface 103 from the valve seat 121. With the valve pushed upwards, away from its valve seat 121, water may freely pass from the water inlet port 114, through valve 100, and out water outlet port 115.

Installation of the valve 100 into an irrigation system typically involves applying a primer to the end of a pipe 130 (such as a PVC pipe), then coating the outer end surface of the pipe 130 with glue 122 (e.g., PVC glue). Finally, the end of the pipe 130 is inserted into the water inlet port 114 or the water outlet port 115. The pipe 130 moves into an outer diameter 127 of the valve 100 until it butts against a smaller, inner diameter 129.

Ideally, an appropriate amount of glue 122 is applied to the pipe 130 and therefore remains only between the pipe 130 and the outer diameter 127. However, it can be difficult to determine exactly what the appropriate amount of glue is. Therefore, contractors will frequently coat the end of the pipe 130 with too much glue 122.

As seen in FIG. 1, this excess glue 122 is often pushed or expelled on to the inner surfaces of the valve 100. When a pipe 130 is moved into the water outlet port 115, the glue 122 can cover the discharge passage 128 of the discharge port 107. Thus, the solenoid 112 is unable to release water from the diaphragm chamber 109, thereby preventing the valve 100 from opening.

FIGS. 2-11 illustrate a preferred embodiment of a valve 200 according to the present invention that includes a glue diverter 202 that prevents the discharge passage 128 from being covered or clogged. As seen best in FIGS. 5-11, the glue diverter 202 terminates the discharge passage 128 at a different elevation than the adjacent inner diameter 129. Therefore, then the pipe 130 is inserted into the valve 200, the excess glue 122 is diverted around the discharge passage 128, ensuring the valve 200 operates as intended.

Figure 10:
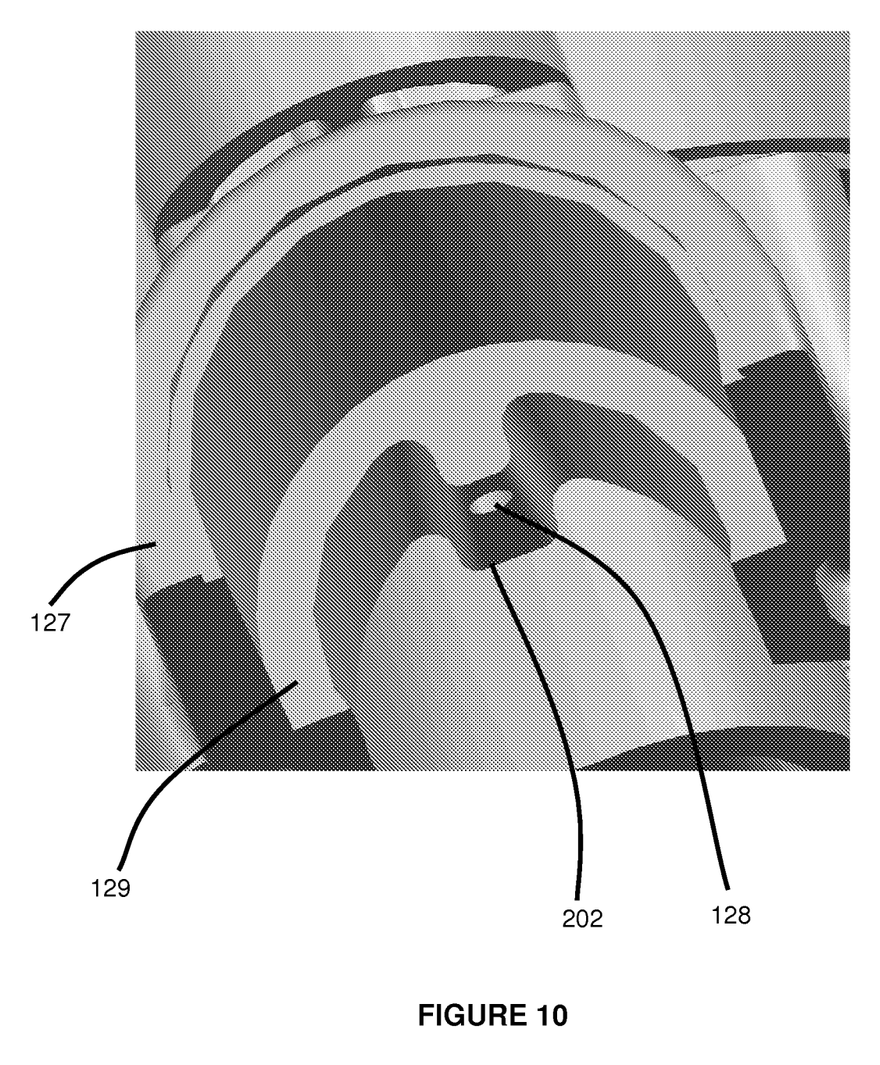
FIG. 10 illustrates an enlarged view of FIG. 9.

As seen best in FIG. 10, the glue diverter 202 preferably includes a relatively cubic or rectangular shape with curved edges. Preferably, the vertical length (i.e., the height of the diverter 202 from the inner diameter 129) of the glue diverter 202 is sufficient to divert a typical amount of glue 122 around or away from the discharge passage 128. More preferably, the vertical length of the diverter 202 is at least one hundred thousandths of an inch. In another preferred embodiment, the vertical length is about 0.2 inches, the width is between about 0.18 and 0.25 inches and the depth is about 0.507 inches.

Preferably, the diverter 202 is a unitary feature of the valve 200, however, the diverter may also be a separate, connectable component fixed to the valve and composed of a rigid or semi rigid material.

Figure 11:
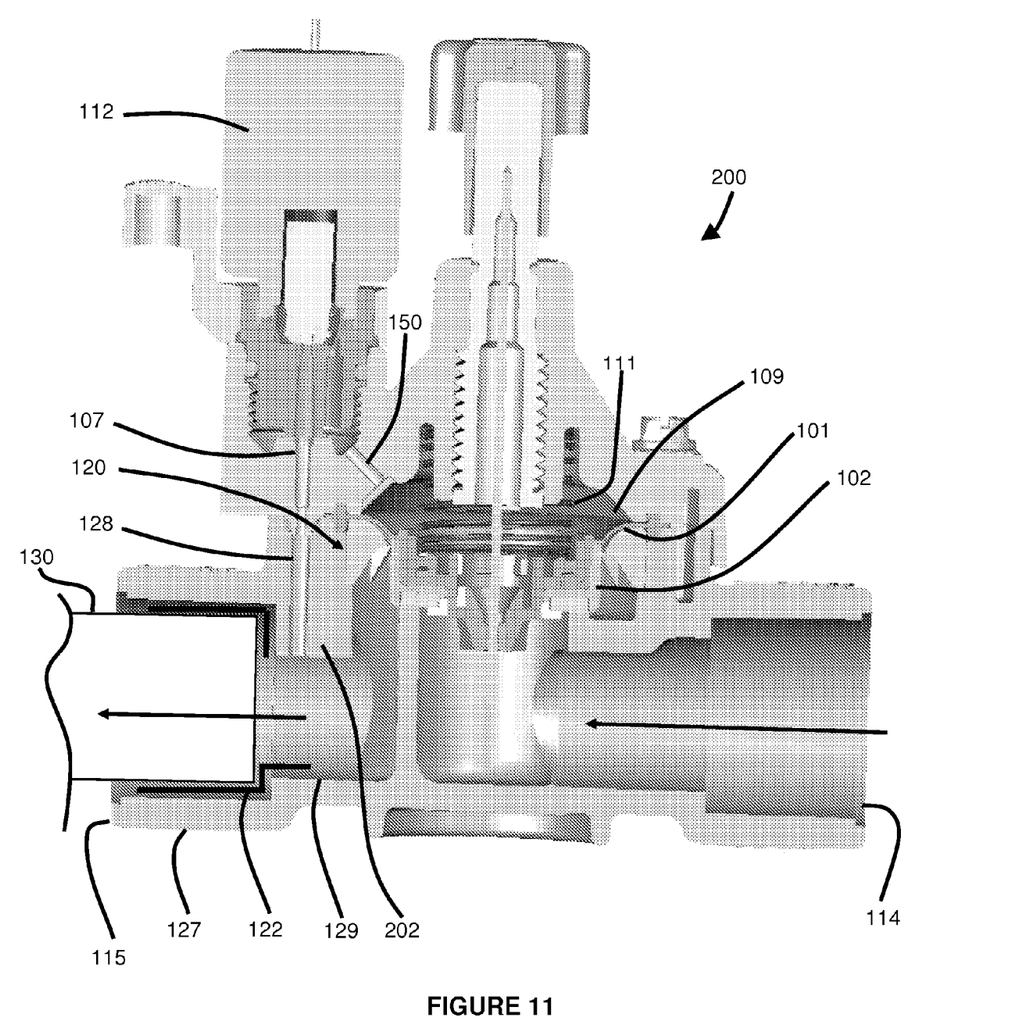
FIG. 11 illustrates a cross sectional view taken along line 11-11.

In operation and referring to FIG. 11, the user applies glue 122 to the end of the pipe 130 and inserts the pipe 130 into the outer diameter 127 of the water outlet port 115 until it reaches the inner diameter 129. Excess glue 122 moves on to the surface of the inner diameter 129, but moves around the glue diverter 202. Thus, discharge passage 128 remains clear and the valve 200 operates normally.

Figure 12:
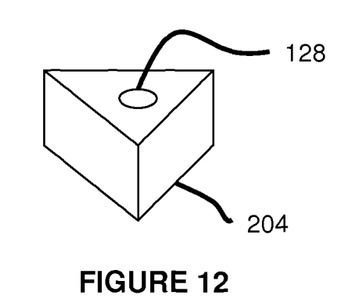
FIG. 12 illustrates a perspective view of a glue diverter according to a preferred embodiment of the present invention.
Figure 13:
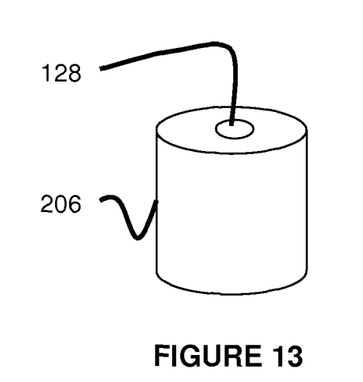
FIG. 13 illustrates a perspective view of a glue diverter according to a preferred embodiment of the present invention; and, FIG. 14 illustrates a perspective view of a glue diverter according to a preferred embodiment of the present invention.
Figure 14:
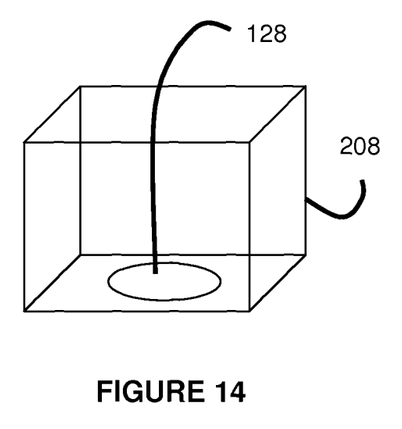

In another preferred embodiment seen in FIG. 12, a glue diverter 204 may have a triangular shape, similar to a pie or wedge. In another preferred embodiment seen in FIG. 13, a glue diverter 206 may have a cylindrical shape. In another preferred embodiment seen in FIG. 14, a glue diverter 208 includes a plurality of walls (e.g., 4) surrounding the discharge passage 128. Optionally, the glue diverter 208 also includes a top surface with water permeable holes within the top surface and optionally the side walls which allow water to pass through while diverting the glue and other debris from the discharge passage 128.

While solenoid valves have been described in this specification, it should be noted that the present invention may be used with any valve in which glue may block a discharge passage. For example, the solenoid 112 shown in the Figures may be replaced by a manual discharge device. In this respect, almost any discharge member or device that discharges pressure to open and close a valve can be used according to the present invention.

Although the invention has been described in terms of particular embodiments and applications, one of ordinary skill in the art, in light of this teaching, can generate additional embodiments and modifications without departing from the spirit of or exceeding the scope of the claimed invention.

Accordingly, it is to be understood that the drawings and descriptions herein are proffered by way of example to facilitate comprehension of the invention and should not be construed to limit the scope thereof.

What is claimed is:

1. A method of diverting glue within a valve comprising:
applying glue to an end surface of a pipe;
inserting said pipe into said valve;
diverting said glue around a discharge aperture within said valve; said discharge aperture being connected to a discharge passage for relieving pressure within a chamber in said valve; said discharge aperture terminating at a raised surface that protrudes from an outlet surface of said valve; said discharge aperture directly facing a portion of said outlet surface.

2. The method of claim 1, wherein said diverting said glue around a discharge aperture further comprises diverting glue around said raised surface located within an outlet of said valve.

3. The method of claim 2, wherein said raised surface member of said valve comprises a shape selected from the following group: cubic, cylindrical and triangular.

4. The method of claim 3, further comprising selectively discharging water through said discharge passage with a solenoid.

5. The method of claim 4, further comprising a solenoid valve.

6. The method of claim 5, wherein said glue is PVC glue.

7. The method of claim 1, wherein said applying glue to an end surface of a pipe further comprises applying glue to an internal surface of said valve.

\* \* \* \* \*